United States Patent Office 2,867,540
Patented Jan. 6, 1959

2,867,540

MODIFIED CARBON BLACK PRODUCT AND PROCESS

Darrel Melvin Harris, Dayton, Ohio, assignor to Monsanto Chemical Company, St. Louis, Mo., a corporation of Delaware No Drawing. Application December 30, 1955
Serial No. 556,444

10 Claims. (Cl. 106—307)

This invention relates to the improvement of carbon black. It is an object of the invention to increase the wettability of the carbon black in order to improve the mixing properties of this material.

It is likewise an object of the present invention to provide mixtures of carbon black together with natural or synthetic rubber, which mixtures are readily formulated into various rubber compositions and products such as masterbatches, tire tread stocks and hard rubber.

It is also an object of the invention to provide a method for the improvement of carbon black by the modification thereof, as the result of chemical reaction with various amines and oxygen. Such method has the object of modifying the physical properties of the carbon black, in particular, the improvement of the wettability.

It is well-known that carbon black is not easily wetted and that it is, therefore, difficult to provide aqueous dispersions of carbon black, despite the fact that such dispersions are highly desirable. The art has long sought a wettable carbon black in order to improve the handling of this dusty material. It is, therefore, another object of the present invention to provide a modified carbon black which is readily wetted and which may, therefore, be used in aqueous systems such as in the manufacture of masterbatches based upon synthetic rubber latices.

It has also been found that the modified carbon black of the present invention is improved in pelleting qualities compared to the untreated black. The modified carbon black has been found to be more readily processed in the pelleting operation and to be less dusty than before the present treatment. The processing of the present carbon black may thus be carried out to obtain pellets or agglomerates, for example, by conducting the treating operation of the present invention in a pelleting mill. If desired, the pelleting operation may be employed as a later step upon the product leaving the reaction vessel. The process of the present invention may also be conducted with carbon black which has already been pelletized.

The treated carbon black of the present invention is of particular utility in the preparation of dispersions for use in water or in nonaqueous liquids. Thus, the modified carbon black may be dispersed in alcohol, benzene, turpentine, mineral spirits, linseed oil, etc. Such dispersions may be incorporated in ink, coating compositions, rubber, and in natural or synthetic resins. The present product may, therefore, be utilized in the preparation of water-dispersable paints.

The present product is also found to be more readily mixed into rubber compositions in roll mixing or Banbury mixing. The mixtures thus prepared may be used in the formulation of various rubber products, for example, hard rubber and tire stocks. The product of the present invention is likewise of great utility in the preparation of masterbatches. In the polymerization of synthetic rubber latices, the modified carbon black is found to be readily dispersed in aqueous systems such as may be employed in synthetic rubber formulations based upon polybutadiene or butadiene and copolymers of styrene.

It has now been found that carbon black may be improved in wetting properties by treatment thereof with an amine, for example, as with ethanolamine, and air or oxygen at a specific temperature. The amine which may be employed may be an aliphatic or aromatic amine, including alkylolamines, having from 2 to 18 carbon atoms, preferably from 2 to 6 carbon atoms. Amines which may be used singly or in mixtures include methylamine, dimethylamine, trimethylamine, ethylamine, diethylamine, triethylamine, n-propylamine, di-n-propylamine, tri-n-propylamine, n-butylamine, isobutylamine, n-amylamine, n-hexylamine, heptylamines, octylamines, nonylamines, decylamines, 2-ethylhexylamine, undecylamines, dodecylamines, octadecylamines, and alos alicyclic amines. Diamines, for example, ethylenediamine, trimethylenediamine, tetramethylenediamine, pentamethylenediamine, hexamethylenediamine may likewise be employed. The alkylolamines having from 2 to 18 carbon atoms, such as ethanolamine, diethanolamine, triethanolamine, as well as the higher homologues constitute a preferred embodiment of the present invention. In addition, alkyl alkylolamines such as methyl ethanolamine, dimethyl ethanolamine, ethyl ethanolamine, and diethyl ethanolamine may be used. Unsaturated amines such as allylamine, and aromatic amines, for example, aniline, methoxyaniline, dimethoxyaniline, diethoxyaniline, benzylamine, phenylethylamine, aminophenol, aminobiphenyl, and benzylamine, as well as heterocyclic amines exemplified by pyridine, morpholine and piperidine may similarly be employed in the practice of the present invention.

The amines may be used per se or in solution with water or other solvents, for example, alcohol, for application to the carbon black. Such use of a liquid is also advantageous in the pelleting of the carbon black.

In the treatement of carbon black, the proportion of the amine is 0.15 percent to 7.5 percent, by weight, calculated as percent nitrogen, based upon the carbon black, a preferred range being from 0.5 percent to 5 percent. The amount of amine employed is such as to supply from 0.15 percent to 7.5 percent of nitrogen to the untreated carbon black. After the oxidative treatment, the amount of nitrogen present in the treated carbon may be from 0.05 to 5 percent by weight. The final product thus obtained is a carbon black containing various decomposition, oxidation, and reaction products of the original amines.

The nature of the chemical reaction occurring in the present invention has not been definitely ascertained, but it has been shown that the treatment of a carbon black with an amine and oxygen results in a marked improvement in the physical properties of the carbon black. The proportion of oxygen is not critical in the present invention. It is not definitely known what reaction products result from such treatment, although the examples of the present invention as set forth below show that some modification of the carbon black takes place, and that a markedly superior product results in comparison to the mere presence of an amine on the carbon black. It has likewise been found, as the result of extended research, that low-temperature oxidation of the carbon, per se, is undesirable. It is necessary to use the combination of reaction with oxygen in the presence of an amine as explained above, to obtain the superior products of the present invention.

The temperature of the carbon black and amine during the addition of the amine is not critical. The temperature which is maintained during the oxidation step is within the range of 50° C. to 350° C. The time of heating is not critical, although it is obvious that the use of higher temperatures permit the operation to be carried out with a shorter reaction time. The heating process may be carried out in an autoclave or other reaction vessel such as a rotary calciner or pelleting mill. The amine may be added as a liquid or as a solution such as in water which may be admixed into the mass of the carbon black, or the amine may be added as a vapor which is carried into the carbon black by an inert gas stream, resulting in the adsorption of the amine upon the surface of the carbon black. The amine may be added in the presence of oxygen, so that the entire process may be conducted as a unitary method, if desired, by charging the amine and oxygen to the carbon black at the same time that the heating takes place. However, it is generally more convenient to conduct the heating and oxygen treatment after the amine has been deposited on the black. All of these operations may be conducted in the same autoclave, calciner, pelleting mill or other reaction vessel.

Carbon blacks contemplated in the present invention include lamp blacks; fine and medium thermal carbon blacks; acetylene blacks; semi-reinforcing furnace carbon blacks; conductive furnace and conductive channel blacks; high elongation furnace carbon blacks; high pH furnace carbon blacks having a pH of from 8.0 to 10.5, usually 8.6 to 10.1, such as high abrasion furnace carbon blacks, super abrasion furnace carbon blacks and high modulus furnace carbon blacks; reinforcing furnace blacks and very fine furnace blacks; and easy, medium, or hard processing channel blacks. In the formulation of rubber compositions, intended for various industrial uses such as tire tread stocks, hard rubber, etc., various adjuvant materials such as pigment, and additives, for example, ferric oxide, magnesium carbonate, titanium dioxide, zinc oxide, hydrated alumina, kieselguhr, slate dust, zinc peroxide, zinc chloride, lead peroxide, lead oxide, chlorinated paraffins, flue, barytes, fossil flour, lithopone, various clays, finely-divided silica, whiting, etc., can be added as sealers or to modify the properties of the vulcanizable composition or vulcanized compositions. In this way, various modifications may be effected of the final properties of the rubber composition such as rate of cure, resistance to scorching during processing, activation of acceleration, etc.

The term "rubber" as used herein is intended to cover both natural and synthetic rubbers and the compositions of the present invention include both natural rubber and rubber-like polymers produced by the polymerization of aliphatic, conjugated diolefins, particularly those having 4 to 8 carbon atoms per molecule such as butadiene, isoprene, pentadienes, etc., or the copolymerization of such diolefins. A preferred group of diolefins are those having from 4 to 6 carbon atoms. The invention also contemplates the copolymerization of the above diolefins, particularly in copolymers in which the diolefins constitute a major proportion, together with a compound containing a $CH_2=C<$ group copolymerizable therewith such as styrene, acrylonitrile, vinylpyridine, vinyl toluene, lower alkyl acrylates, etc. Examples of such elastomers are copolymers of butadiene-styrene, of isoprene-styrene, of butadiene-acrylonitrile, and polymers of butadiene, etc.

In the vulcanization of the rubber products of the present invention, conventional vulcanizing methods and apparatus can be used to vulcanize the above-described polymers. A preferred vulcanizing agent is sulfur, and accelerators are generally used. The amount of sulfur employed in the vulcanization of the conjugated diolefin is usually in the range of from 0.5 to 7 parts by weight per 100 parts by weight of polymer, with 3 to 6 parts by weight being preferred. Vulcanization temperature depends upon the accelerator employed and will usually be in the range of from 150 to 300° F. Vulcanization time will usually be in the range of from 0.5 to 8 hours. Vulcanizing agents are added to vulcanize the organic elastomers during the vulcanization step of processing. There are a wide variety of vulcanizing agents such as: sulfur compositions, generally including sulfur, powdered sulfur, and one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agnts; diazoaminobenzene and its derivatives; other nitrogen-containing compounds, etc.

Accelerators of vulcanization are added to accelerate vulcanization during the vulcanization step of processing. There are many known accelerators of vulcanization, such as: thioureas; thiophenols; mercaptans; dithiocarbamates; xanthates; trithiocarbamates; dithio acids; mercaptothiazoles; mercaptobenzothiazoles; thiuram sulfides; organic-cobalt chelates; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram disulfide, N-cyclohexyl-2-benzothiazole sulfenamide, aldehyde-ammonias, triphenylguanidine, zinc dibutyl and zinc dimethyl dithiocarbamate, many others, and mixtures thereof. Such accelerators can be used in vulcanizing the above polymers or natural rubber to produce the ultimate products of this invention.

In most cases it is the usual practice to add age resistors or antioxidants to vulcanizable organic elastomer mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4-toluenediamine, p-ditolylamine, o-ditolylamine, beta-naphthyl-nitrosoamine, N,N - diphenyl diaminoethane, phenyl-alpha-naphthylamine, p,p-diaminodiphenylmethane, etc.

The vulcanizable organic elastomer compositions resulting from admixing the various ingredients with softeners, plasticizers and tackifiers are vulcanized in the usual manner, after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printers rolls, printers blankets, engraving plates, aprons, gloves, masks, tanks, battery cases, friction tape mats, wire insulation, hard rubber, etc. Fabrics can be coated or impregnated by calendering or impregnation with a suitable emulsion.

Specific embodiments of the present invention are shown in the following examples:

Example 1

One hundred grams of furnace black are mixed with 6 grams of ethanolamine in an autoclave maintained with a positive atmosphere of nitrogen during the addition of the amine. The reactor is then evacuated to a pressure of 20 mm. of mercury for 3 minutes after which air is admitted until atmospheric pressure is reached. The reactor is then heated to a temperature of 300° C., while being agitated for a period of 12 minutes at atmospheric pressure. The reactor and contents are cooled to 30° C., after which the carbon black is removed for packaging. A test of the wettability of the treated carbon black shows that the treated material is completely wetted by water.

More precise measurement of the wettability of carbon black can be determined by measuring the heat of wetting by water. This test is conducted by a calorimetric method.

Measurement of the heat of wetting of the pelleted carbon black samples of Example 1, as well as an untreated sample, gives the following data:

Example 1 _____ $\Delta H_u = 1.24 \pm 0.05$ cal./g.
Untreated control_____ $\Delta H_u = 0.77 \pm 0.02$ cal./g.

In general, the products of the present invention may have a heat of wetting of at least 1.0 cal./g., a preferred range being from 1.0 to 2.0 cal./g.

*Example 2*

A treating process using furnace black is carried out similarly to that of Example 1, but without the use of an amine, i. e., by the use of oxidation alone. The carbon black thus produced is found to resist wetting by water and, even after remaining in contact with water for a period of 24 hours, is found to be completely unwetted.

*Example 3*

In order to demonstrate the necessity of oxygen in the treatment of the carbon-amine mixture, 100 grams of furnace black are mixed with 3 grams of ethanolamine in an autoclave maintained at 125° C. with a positive pressure of nitrogen during the addition of the ethanolamine and for one hour thereafter. No oxygen is admitted during this heating step. In order to compare the product of the present example with the other examples referring to oxidative treatments, the present material is tested to determine the speed of wetting of the treated carbon black. It is found that the time of wetting of the carbon black in water is more than 24 hours, and at the end of this time, a substantial proportion (e. g., more than 50%) is still in an unwetted condition.

*Example 4*

One hundred grams of channel black are mixed with 64.5 g. of dibutylamine, which is blown into the black by a stream of air. The mixture is then tumbled in a mixer maintained at 300° C. for one hour while passing air into the mixer. The product is readily wetted by water, while a control experiment shows that the untreated channel black is not wetted.

*Example 5*

A treating process is carried out similarly to that of Example 1, but using an aqueous solution of the amine. One hundred grams of furnace black are mixed with a solution of 3 g. of ethanolamine in 3 g. of water in an autoclave without the use of an inert atmosphere. Air is admitted to the mixture in amounts corresponding to ten times the volume of the vessel which is about 1/10 filled with the charge of the carbon black. During the admission of air, the reactor is heated to a temperature of about 125° C. After the oxidation is completed, the reactor and contents are cooled to 30° C., after which the carbon black is removed from the vessel. The treated carbon black is found to be readily wetted by water.

*Example 6*

Twenty-five grams of lampblack having a pH value of 6.6 are mixed with 1.5 grams of ethanolamine to yield a mixture having a pH of about 9.0. The mixture is placed in a glass tube open to the atmosphere, and heated to 150° C. for one hour followed by increased heating to 229° C. The product is cooled and the pH value found to be substantially the same as the original lampblack. The final product, weighing 20 grams, is readily and completely wetted by water.

*Example 7*

The procedure of Example 1 is followed using a mixture of 100 grams of acetylene black and 1.27 grams of ethyl ethanolamines, technical grade. Oxidation of the mixture is conducted at about 60° C. in the presence of air enriched by oxygen. The product is readily wetted by water.

*Example 8*

A rubber composition is prepared using the following compounding recipe:

| | Parts by weight |
|---|---|
| Butadiene/acrylonitrile copolymer | 100 |
| Carbon black of Ex. 4 (treated channel black) | 60 |
| Zinc oxide | 5 |
| Stearic acid | 1.5 |
| Sulfur | 1.5 |
| Benzothiazyl disulfide | 1.5 |
| Polybutadiene liquid plasticizer | 10 |

The above formulation is mixed and cured at 307° F. for 30 minutes to give a rubber composition of excellent resistance against swelling and extractability when tested in organic solvents.

The treated carbon black obtained by the above-described process may be utilized with natural and synthetic rubber. A typical rubber heel compound, for example, may be formulated from 10 parts of natural rubber, 60 parts of whole tire reclaim, 2 parts of GR–S and 20 parts of the above-described carbon black obtained by treatment of furnace black with ethanolamine. The above components are mixed on a rubber mill together with the usual proportions of sulfur, zinc sulfide, zinc oxide, pine tar, a coal tar softener, and N-cyclohexyl-2-benzothiazole sulfenamide as the accelerator. In the same way, a typical tire tread compound is formulated from 95 parts of GR–S and 50 parts of channel black, treated with dibutylamine as described above.

The present invention also contemplates the preparation of rubber compositions utilizing the masterbatch technique. In carrying out this process, the present treated carbon black in the form of a dispersion or slurry in water, can be added to natural rubber latex or a synthetic rubber latex or the treated carbon black can be incorporated in the latex such as by adding modified carbon black as described above to a latex, followed by agitation of the mixture. The quantity of carbon black to be added is not critical, and may vary in the range of from 20 to 75 parts per 100 parts of solids in the latex. The carbon black can all be added to the latex and thus may be masterbatched prior to coagulation, or part (for example, 20 or more parts of carbon black per 100 parts of solids in the latex) of the carbon black can be masterbatched with the latex prior to coagulation of the polymer, and the remainder (up to 75 parts per 100 parts of solids) added on the mill when compounding the polymer. As a practical expedient, it is desirable to masterbatch a quantity of carbon black with the latex that is slightly less than the amount desired in the final rubber, so that the remainder of the carbon black may be added on the mill. This method of operation tends to avoid the addition of excessive amounts of carbon black to the rubber.

After the carbon black has been thoroughly distributed throughout the latex, the polymer is coagulated in any conventional manner such as by the brine-acid or brine-alcohol method of coagulation. Following coagulation, the polymer is further treated and processed in a conventional manner, i. e., washed, dried, and compounded according to known compounding formulas.

The following example illustrates in further detail how a rubber formulation may be prepared employing the above-described treated carbon black utilizing a polymer such as styrene-butadiene or polybutadiene.

Example 9

Polybutadiene is prepared at a polymerization temperature of 86° F. according to the following recipe:

| Ingredient | Parts by weight |
|---|---|
| Water, total [1] | 180 |
| Butadiene | 100 |
| Dresinate 214 [2] | 4.0 |
| MTM [3] | 0.50 |
| Cumene hydroperoxide | 0.025 |
| KOH | 0.10 |
| Daxad 11 [4] | 0.10 |
| $Na_3PO_4 \cdot 12H_2O$ | 0.50 |
| Dextrose | 0.25 |
| $K_4P_2O_7$ | 0.018 |
| $FeSO_4 \cdot 7H_2O$ | 0.014 |

[1] Total water present including that added in soap solution and in activator solution.
[2] Potassium salt of rosin soap.
[3] A blend of tertiary $C_{12}$, $C_{14}$, and $C_{16}$ aliphatic mercaptans in a ratio of 3:1:1 parts by weight.
[4] A sodium salt of condensed alkyl aryl sulfonic acid.

The activator solution (reaction product of $K_4P_2O_7$ and $FeSO_4 \cdot 7H_2O$) is prepared according to the following procedure: the ferrous sulfate is dissolved in water which has been adjusted to a pH of 3.0 to 4.0 by the addition of 5% sulfuric acid. The potassium pyrophosphate is then added and the solution heated to 140° F. and cooled immediately to room temperature.

The polymerization is effected in a glass lined, jacketed reactor, the ingredients being charged in the following order:

(1) Soap solution comprising water, Dresinate 214, trisodiumphosphate, potassium hydroxide, dextrose, and Daxad 11.
(2) Mercaptan (MTM), activator (prepared according to above procedure), when the temperature reached 86° F.
(3) Butadiene.
(4) Cumene hydroperoxide.

The mixture is agitated throughout the polymerization reaction and the temperature is maintained at 86° F.

When a conversion of 58.8% is reached, the reaction is shortstopped by the addition of 0.15 part dinitrochlorobenzene (based on butadiene charged). The reaction mixture is then vented to remove unreacted butadiene, and the latex stabilized by the addition of 1.5% phenyl-beta-naphthylamine, based on the rubber.

The stabilized latex resulting from the polymerization reaction is masterbatched with a carbon black slurry prepared according to the following recipe:

| Ingredient: | Parts by weight |
|---|---|
| Modified carbon black of Ex. 1 | 100 |
| Water | 850 |
| Marasperse CB [1] | 2.2 |
| Sodium hydroxide | 0.3 |

[1] Sodium lignin sulfonate.

A sufficient amount of the slurry is blended with the latex to produce a final product containing 47.5 parts carbon black per 100 parts rubber. An additional 2.5 parts of the said treated carbon black per 100 parts of rubber is added on the mill in compounding to produce a final rubber containing 50 parts of black per 100 parts of rubber.

Following masterbatching of the latex with carbon black, the polymer is coagulated by the brine acid method. The latex is creamed with brine and the crumb is flocculated at a pH of 2.0 to 4.0 and a temperature of 120° F. The rubber is then given two acid washes at 120° F. and one cold water wash.

The coagulated polymer is dried in a tray drier at 170° F. After coagulation, washing and drying the polymer is compounded according to the following recipe:

| Ingredient | Parts by weight |
|---|---|
| Masterbatch (polybutadiene plus treated black) | 150.0 |
| Zinc oxide | 3.0 |
| Stearic acid | 1.0 |
| Flexamine [1] | 1.0 |
| Circosol–2XH–Paraflux [2] | 5.0 |
| Sulfur | 2.25 |
| Accelerator | Variable |

[1] Mixture containing 65 percent of a complex diarylamine-ketone reaction product and 35 percent of N,N'-diphenyl-p-phenlyenediamine.
[2] A blend of equal parts of Circosol-2XH (a petroleum hydrocarbon softener) and Paraflux (an asphaltic flux).

The above rubber upon vulcanizing is found to yield a superior product. In addition, it is noted that an unusually fine crumb size is obtained in the preparation of the masterbatch.

What is claimed is:

1. A process for the improvement of carbon black which comprises mixing carbon black with 0.15 to 7.5 percent by weight of an amine, calculated as percent nitrogen, the said amine having from 2 to 18 carbon atoms, and heating the said mixture to a temperature of from 50° C. to 350° C. in the presence of oxygen.

2. A process for the improvement of carbon black which comprises mixing carbon black with from 0.15 to 7.5 percent of an alkylolamine, calculated as percent nitrogen, the said alkylolamine having from 2 to 18 carbon atoms, and heating the said mixture to a temperature of from 50° C. to 350° C. in the presence of oxygen.

3. A process for the improvement of carbon black which comprises mixing carbon black with 0.15 to 7.5 percent of ethanolamine, calculated as percent nitrogen, and heating the said mixture to a temperature of from 50° C. to 350° C. in the presence of oxygen.

4. Improved carbon black resulting from the oxidation of a mixture of carbon black and an amine having from 2 to 18 carbon atoms, the proportion of the said amine being from 0.15 percent to 7.5 percent by weight, calculated as percent nitrogen, the said mixture of carbon black and the said amine having been heated to a temperature of from 50° C. to 350° C. in the presence of oxygen.

5. Improved carbon black resulting from the oxidation of a mixture of carbon black and an alkylolamine having from 2 to 18 carbon atoms, the proportion of the said amine being from 0.15 percent to 7.5 percent by weight, calculated as percent nitrogen, the said mixture of carbon black and alkylolamine having been heated to a temperature of from 50° C. to 350° C. in the presence of oxygen.

6. Improved carbon black resulting from the oxidation of a mixture of carbon black and ethanolamine, the proportion of the said ethanolamine being from 0.15 percent to 7.5 percent by weight, calculated as percent nitrogen, the said mixture of carbon black and the ethanolamine having been heated to a temperature of from 50° C. to 350° C. in the presence of nitrogen.

7. A process for the improvement of carbon black which comprises mixing carbon black with 0.15 to 7.5 percent of ethyl ethanolamine, calculated as percent nitrogen, and heating the said mixture to a temperature of from 50° C. to 350° C. in the presence of oxygen.

8. A process for the improvement of carbon black which comprises mixing carbon black with from 0.15 to 7.5 percent by weight, calculated as percent nitrogen, of an amine having from 2 to 18 carbon atoms, and heating the said mixture to a temperature of from 50° C. to 350° C. in the presence of oxygen, and thereafter cooling the said treated carbon black to obtain a carbon black having a heat of wetting of at least 1.0 cal./g.

9. Improved carbon black resulting from the oxidation of a mixture of carbon black and an amine in the proportion of from 0.15 percent to 7.5 percent by weight of the amine, calculated as percent nitrogen, the said amine having from 2 to 18 carbon atoms, and the said mixture of carbon black and the amine having been heated to a temperature of from 50° C. to 350° C. in the presence of oxygen, followed by cooling of the said treated carbon black to obtain a carbon black having a heat of wetting of at least 1.0 cal./g.

10. An aqueous dispersion of water and a water-wettable carbon black obtained by reacting oxygen with a mixture of carbon black and 0.15 to 7.5 percent by weight, calculated as percent nitrogen, of an amine having from 2 to 18 carbon atoms.

References Cited in the file of this patent

UNITED STATES PATENTS

| | | |
|---|---|---|
| 1,848,213 | Wiegand | Mar. 8, 1932 |
| 2,178,383 | Wiegand | Oct. 31, 1939 |
| 2,210,763 | King et al. | Aug. 6, 1940 |
| 2,419,512 | Vesce | Apr. 22, 1947 |
| 2,597,741 | Macey | May 20, 1952 |
| 2,719,092 | Grady | Sept. 27, 1955 |